United States Patent [19]

Waggoner

[11] Patent Number: 4,861,828

[45] Date of Patent: Aug. 29, 1989

[54] TOUGHENED THERMOPLASTIC POLYARYLATE-POLYAMIDE COMPOSITIONS

[75] Inventor: Marion G. Waggoner, Hockessin, Del.

[73] Assignee: E. I. Du Pont de Nemours and Company, Wilmington, Del.

[21] Appl. No.: 35,005

[22] Filed: Apr. 6, 1987

[51] Int. Cl.$^4$ .................. C08L 67/02; C08L 77/00
[52] U.S. Cl. .................................. 525/66; 525/68; 525/132; 525/425
[58] Field of Search ................ 525/425, 66, 176, 132

[56] References Cited

U.S. PATENT DOCUMENTS

| | | | |
|---|---|---|---|
| 3,193,522 | 7/1965 | Neumann et al. | 260/45.9 |
| 3,835,098 | 9/1974 | Brown et al. | 260/75 N |
| 4,052,481 | 10/1977 | Asahara et al. | 260/857 PE |
| 4,171,330 | 10/1979 | Kyo et al. | 525/180 |
| 4,187,358 | 2/1980 | Kyo et al. | 525/132 |
| 4,206,100 | 6/1980 | Kyo et al. | 260/22 R |

FOREIGN PATENT DOCUMENTS

| | | |
|---|---|---|
| 52-98765 | 8/1977 | Japan . |
| 54-141840 | 11/1979 | Japan . |
| 54-144455 | 11/1979 | Japan . |
| 56-14699 | 4/1981 | Japan . |
| 61-183353 | 8/1986 | Japan . |
| 61-213256 | 9/1986 | Japan . |
| 61-213257 | 9/1986 | Japan . |

OTHER PUBLICATIONS

H. Ulrick, Polyurethane Stabilizers, Journal of Elastomers and Plastics, vol. 18, pp. 147–158 (Jul. 1986).

Primary Examiner—Patricia Short

[57] ABSTRACT

Thermoplastic polyarylate-polyamide compositions optionally including an elastomeric modifier show improved notched Izod toughness with the further inclusion of a small quantity of polycarbodiimide.

27 Claims, No Drawings

TOUGHENED THERMOPLASTIC POLYARYLATE-POLYAMIDE COMPOSITIONS

TECHNICAL FIELD

This invention relates to certain thermoplastic polyarylate-polyamide compositions that are characterized by improved toughness. Thermoplastic polyamides include semi-crystalline and amorphous condensation products of saturated dicarboxylic acids with diamines. Useful materials of that type generally have a molecular weight of at least 5000 and are commonly referred to as nylons. Nylons have been long been known and useful in various engineering applications because of several properties characteristic of such materials, including good elongation and high energy to break as measured in tensile tests, high tensile impact strength and high energy absorbtion as demonstrated in falling dart tests. In addition polyamides possess good chemical resistance and good processing characteristics. The desire to obtain improved properties at high temperatures and the deterioration of the above-mentioned physical properties that results fro prolonged exposure to and absorption of moisture has given rise to blends of polyamides with various thermoplastic materials, including polyacrylates. Thermoplastic polyarylates, sometimes referred to as aromatic polyesters, are generally understood to include polymers derived from the reaction of one or more dihydric phenols with one or more aromatic dicarboxylic acids. Polyarylates possess good impact strength as measured by notched Izod tests, and various other desirable properties. However, the desire to reduce the relatively high melt viscosity and improve the processing characteristics of polyarylates has given rise to blends of polyarylates with various thermoplastic materials, including polyamides. It has been found, however, that while such polyarylate-polyamide blends do possess certain desirable properties, including improved processing characteristics, such compositions do sacrifice notched Izod impact strength. In fact, the notched Izod impact strength of such blends can be lower than the impact strength of either component of the blend taken separately. Thus the present invention relates to thermoplastic polyarylate-polyamide compositions having improved impact strength.

The compositions of the present invention are useful in preparing semi-finished and finished articles by any of the techniques commonly used with thermoplastic materials, e.g., compression molding, injection molding, extrusion, blow molding, rotational molding, melt spinning, stamping and thermoforming. Finished products made from such compositions possess extremely desirable physical properties, including high stiffness and solvent resistance, but especially high impact resistance as measured by notched Izod tests.

BACKGROUND ART

Japanese patent publication No. 56-14699, published Apr. 6, 1981, discloses compositions comprising 100 parts by weight of certain aromatic polyesters and not more than 100 parts by weight of a polyamide. Such compositions are said to have improved mold processability, chemical resistance, low temperature resistance, and oil resistance. This publication notes that processability improves when the amount of polycaprolactam is 50% by weight or greater, but the physical properties drastically deteriorate; and that similar trends are observed with other polyamides as with polycaprolactam.

Japanese patent publication No. 54-144455, published Nov. 10, 1979, discloses blends of 0.1–10 parts by weight of a non-crystalline polyamide with 100 parts by weight of an aromatic polyester, which blend is said to have heat-resistant deformation, mechanical strength, transparency and improved processing properties.

Japanese patent publication No. 54-141840, published May 11, 1979, discloses compositions similar to that described immediately above except that the aromatic polyester contains a component derived from a trivlanet alcohol. Such blends are said to have improved moldability without impairing the heat distortion resistance, mechanical properties, transparency and stress cracking resistance of the blends.

Japanese patent publication No. 52-98,765, published Aug. 18, 1977. discloses compositions comprising 100 parts by weight of certain aromatic polyesters and more than 100 parts by weight of a polyamide. Such compositions are said to have excellent moldability, chemical resistance and heat resistance.

U.S. Pat. No. 4,206,100, granted June 3, 1980 to Kyo et al, discloses resin compositions consisting essentially of an aromatic copolyester, a polyamide and certain metal compounds. Such compositions are said to have improved mechanical characteristics, including improved impact and brittleness at thin walled portions.

U.S. Pat. No. 4,187,358, granted Feb. 5, 1980 to Kyo et al, discloses compositions similar in identity and properties to those described immediately above, except that these contain an ionomer instead of the metal compound.

U.S. Pat. No. 4,171,330, granted Oct. 16, 1979 to Kyo et al, discloses flame retardant compositions comprising an aromatic copolyester, a polyamide, a polyalkylene phenylene ester or ester ether, and an aromatic halogen.

U.S. Pat. No. 4,052,481, granted Oct. 4, 1986 to Asahara et al, discloses compositions substantially as described immediately above except without the aromatic halogen.

U.S. Pat. No. 3,835,098, granted Sept. 10, 1974 to Hoeschele et al, discloses thermoplastic elastomeric copolyester compositions having improved elastomeric, physical and stability properties, which compositions comprise a blend of such copolyesters with at least one polycarbodiimide.

U.S. Pat. No. 3,193,522, granted July 6, 1965 to Neumann et al, discloses polyesters stabilized against hydrolysis with polycarbodiimides.

H. Ulrich, Polyurethane Stabilizers, Journal of Elastomers and Plastics, Vol. 18, pp. 147–158 (July 1986), discloses the use of polycarbodiimides to improve the hydrolytic stability of polyester based polyurethane elastomers.

None of the references listed and discussed above disclose the particular blends of the present invention, or the unexpected improvement in impact strength that can be imparted to polyarylate-polyamide blends by including in such blends certain polycarbodiimides.

DISCLOSURE OF THE INVENTION

This invention relates to certain thermoplastic polyarylate-polyamide compositions that are characterized by improved impact resistance as measured by notched Izod tests. More specifically, this invention comprises thermoplastic compositions consisting essentially of:

(a) 10–60 weight percent of at least one polyamide, (b) 0.05-1.0 weight percent of at least one polycarbodiimide having a number average molecular weight as determined by vapor pressure osmometry greater than 2000 and containing units of the formula

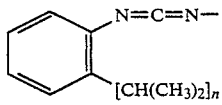

where n has an average value of about 3, and (c) a complemental amount of at least one polyarylate. The compositions of the present invention may also contain (d) 0-20 weight percent of an elastomeric modifier, and various other additives as may be conventionally included in such compositions. All of the above-recited weight percents are based of the total weight of the composition.

The compositions of the present invention will include multi-phase melt blends of the above ingredients, and, since two or more of the above ingredients may react or interact with each other, the compositions of the present invention will also include melt blends of the reaction products thereof. The product of the melt mixing is complex and not well understood because each of the components is capable of reacting with any of the other components. For example, when the elastomeric modifier contains epoxide groups, the polyarylate is capable of reacting with the elastomeric modifier via a reactive end group or through reaction of an ester group with the epoxide group. Likewise, the polycarbodiimide may react with either or both of the polyarylate and the polyamide.

The reactions between the various components of the compositions of the present invention are usually completed during the melt mixing or compounding operation. Under conditions of melt mixing which are not sufficiently intense, the reactions described above may not be completed. These blends are considered part of this invention because they remain reactive and are easily converted into a normal blend by further melt mixing step as would occur in either another extrusion step or during injection molding.

Component (a) polyamide will comprise 10-60 weight percent, preferably 30-50 weight percent, and most preferably 35-50 weight percent of the composition. Compositions containing less than 30 weight percent polyamide generally have inferior solvent resistance. Component (b) polycarbodiimide will comprise 0.05-1.0 weight percent, preferably 0.1-0.5 weight percent of the composition. Compositions containing more than 1.0 weight percent polycarbodiimide simply show no increased toughness as compared with those containing 1.0 weight percent. In addition, high levels of the polycarbodiimide can cause high melt viscosity of the composition, and thereby make difficult molding of large parts. Compositions containing less than 0.05 weight percent polycarbodiimide do not show significant improvement in toughness as compared with those containing no polycarbodiimide. If the composition also contains component (d) elastomeric modifier, it will comprise up to 20 weight percent, preferably 5-15 weight percent, and most preferably about 10 weight percent of the composition. Other than certain additives that are commonly used in such compositions in minor quantity, the remainder of the composition will comprise polyarylate, i.e. the compositions of the present invention will contain a complemental amount of polyarylate, that is an amount of polyarylate sufficient to bring the composition up to 100 weight percent.

The polyamides used in the compositions of the present invention include those semi-crystalline and amorphous resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains 4 to 14 carbon atoms. Examples of polyamides include polyhexamethylene adipamide (66 nylon), polyhexamethylene azelaamide (69 nylon), polyhexamethylene sebacamide (610 nylon), polyhexamethylene dodecanoamide (612 nylon), and polyamides produced by ring opening of lactams, e.g. polycaprolactam, polylauric lactam, poly-11-aminoundecanoic acid, and bis(paraaminocyclohexyl)methane dodecanoamide. It is also possible in the compositions of the present invention to use polyamides prepared by the copolymerization of two of the above polymers or terpolymerization of three of the above polymers or their components, e.g. an adipic, isophthalic acid hexamethylene diamine copolymer. Preferably the polyamides are semi-crystalline and linear with a melting point in excess of 200 degrees C.

The polycarbodiimide used in the compositions of the present invention can be a single polycarbodiimide or can be a mixture of polycarbodiimides having a number average molecular weight of at least 2000 and containing units of the formula

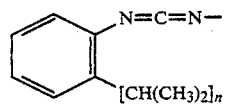

where n has an average value of about 3.

The polyarylates used in the compositions of the present invention are aromatic polyesters derived from one or more dihydric phenols and one or more aromatic dicarboxylic acids. The dihydric phenol can be a bisphenol as described in U.S. Pat. No. 4,187,358 as sturucture 1:

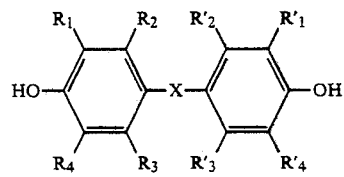

wherein —X— is selected from the group consisting of nothing, —O—, —S—, —SO$_2$—, —SO—, —CO—, an alkylene group containing 1 to 5 carbon atoms and an alkylidene group containing 2 to 7 carbon atoms, and R$_1$, R$_2$, R$_3$, R$_4$, R$_1'$, R$_2'$, R$_3'$ and R$_4'$, which may be the same or different, each is selected from the group consisting of a hydrogen atom, a chlorine atom, a bromine atom and an alkyl group containing 1 to 5 carbon atoms, and/or a functional derivative thereof.

Suitable examples of alkylene groups for X containing 1 to 5 carbon atoms include a methylene group, an ethylene group, a propylene group, a tetramethylene group and a pentamethylene group. Suitable examples of alkylidene groups for X containing 2 to 7 carbon atoms include an ethylidene group, a propylidene group, an isopropylidene group, an isobutylidene group and a pentylidene group, a cyclopentylidine group and a cyclohexylidine group.

Suitable examples of alkyl groups for $R_1$ to $R_4$ and $R_1'$ to $R_4'$ containing 1 to 5 carbon atoms include a methyl group, an ethyl group, an isopropyl group, a tert-butyl group and a neopentyl group.

Additionally, up to 40 mole % of dihydric aromatic phenols of the formula:

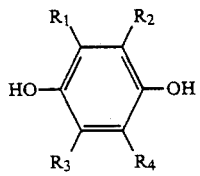

may be used in combination with the bisphenols wherein $R_1$–$R_4$ are as previously described.

Preferably, a mixture of 60 to 0 mole % of terephthalic acid and/or the functional derivatives thereof and 40 to 100 mole % of isophthalic acid and/or its functional derivatives is used as the acid component to be reacted with the bisphenol to prepare the polyarylate used in the compositions of the present invention. More preferably, a mixture of 0 to 50 mole % of terephthalic acid and/or the functional derivatives thereof and 100 to 50 mole % of isophthalic acid and/or the functional derivatives thereof is used. The molar ratio of the bisphenol to the sum of the terephthalic acid units and isophthalic acid units is substantially equimolar, e.g., about 1:0.95 to 1.2, preferably about 1:1, most preferably 1:1. Aromatic hydroxy acids such as hydroxy benzoic or hydroxy naphthoic acid and other dicarboxylic acids (both aromatic and aliphatic) can also be incorporated into the polyarylate structure as a minor component.

Examples of functional derivatives of terephthalic or isophthalic acid which can be used in this invention include acid halides and diaryl esters. Preferred examples of the acid halides include terephthaloyl dichloride, isophthaloyl dichloride, terephthaloyl dibromide and isophthaloyl dibromide. Preferred examples of diaryl esters include diphenyl terephthalate and diphenyl isophthalate.

Examples of suitable bisphenols are 4,4'-dihydroxydiphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, 1,1-bis(4-hydroxyphenyl)cyclohexane, 1,1-bis(4-hydroxyphenyl)cyclopentane, 1,1-bis(4-hydroxyphenyl)cycloheptane, bis(4-hydroxy-3,5-dibromophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 3,3,3',3'-tetramethyl spirobis-1,1'-indane-6,6'-diol and 1,1-bis(4-hydroxyphenyl)-n-butane. 2,2-Bis(4-hydroxphenyl)propane is most preferred.

Typical examples of the functional derivatives of the bisphenol which can be used are the alkali metal salts and diesters with aliphatic monocarboxylic acid containing 1 to 3 carbon atoms. Suitable examples of aliphatic monocarboxylic acids include formic acid, acetic acid, propionic acid, etc. Preferred functional derivatives of the bisphenols are the sodium salts, the potassium salts, and the diacetate esters.

The bisphenol can be used either individually or as a mixture of two or more. Further, mixed salts or mixed carboxylate esters may be used.

In the preparation of the polyarylate, at most 50 mole %, preferably at most 25 mole %, of a compound having a carbonate linkage such as diphenyl carbonate or an aliphatic glycol such as ethylene glycol, propylene glycol, tetramethylene glycol or neopentyl glycol may also be copolymerized therewith to improve the molding characteristics. To change the reactivity and possibility the stability of the polyarylate, monofunctional components can be included in the polyarylate to limit molecular weight or reduce the proportions of reactive ends.

Polyarylates useful in the compositions of the present invention can be prepared by any of several known methods. The interfacial polymerization method comprises mixing a solution of an aromatic dicarboxylic acid chloride in a water-immiscible organic solvent with an alkaline aqueous solution of bisphenol. The solution polymerization method comprises heating bisphenol and a diacid dichloride in an organic solvent. One melt polymerization method comprises heating a diphenyl ester of an aromatic dicarboxylic acid and bisphenol. An alternate melt polymerization method comprises heating aromatic dicarboxylic acid and a diester (e.g., the diacetate ester) of bisphenol. These methods are described in detail in U.S. Pat. Nos. 3,884,990, 3,946,091, 4,052,481 and 4,485,230.

In order to insure good physical properties in the compositions of the present invention, the polyarylate should have a logarithmic viscosity number ($\eta_{inh}$ or IV), defined by the following equation, of about 0.35 to about 1.5, preferably 0.40 to 0.65

$$\eta\text{inh} = \frac{\ln t_1/t_2}{C}$$

wherein $t_1$ is the falling time (in seconds) of a solution of the polyarylate, $t_2$ is the falling time (in seconds) of the solvent; and C is the concentration (g/dl) of the polyarylate in the solution. The logarithmic viscosity number used herein is determined in a trifluoroacetic acid-methylene chloride mixture (25/75 by volume) at 30° C. The procedure is further described in Textbook of Polymer Science by F. Billmeyer, p. 79 (John Wiley & Sons, 1962).

The elastomeric modifiers used in the compositions of the present invention will include those commonly used in thermoplastic compositions based on either polyamides or polyesters. For example a class of elastomeric modifiers useful in both polyamides and polyesters are disclosed in U.S. Pat. Nos. 4,174,358 and 4,172,859, the subject matter of which is hereby incorporated by reference into the present description. Such modifiers are characterized as having adherent sites, and having a tensile modulus in the range of about 1.0 to 20,000 p.s.i., with the ratio of the tensile modulus of the matrix polyamide or polyester to the tensile modulus of the modifier being greater than 10 to 1. Such modifiers are also characterized by the general formula

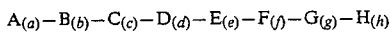

Such modifiers are described as branched or straight chain polymers derived in any order, e,g, random, from monomers A to H where A is ethylene;
B is CO;
C is an unsaturated monomer taken from the class consisting of alpha,beta-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;
D is an unsaturated epoxide of 4 to 11 carbon atoms;
E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;
F is an unsaturated monomer taken from the class consisting of acrylate esters having from 4 to 22 carbon atoms, vinyl esters of acids having from 1 to 20 carbon atoms (substantially no residual acid), vinyl ethers of 3 to 20 carbon atoms, and vinyl and vinylidene halides, and nitriles having from 3 to 6 carbon atoms;
G is an unsaturated monomer having pendant hydrocarbon chains of 1 to 12 carbon atoms capable of being grafted with monomers having at least one reactive group of the type defined in C, D and E, and pendant aromatic groups which may have 1 to 6 substituent groups having a total of 14 carbon atoms; and
H is an unsaturated monomer taken from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C, D and E.

The aforementioned monomers may be present in the polymer in the following mole fraction:
(a) 0 to 0.95;
(b) 0 to 0.3;
(c) 0 to 0.5;
(d) 0 to 0.5;
(e) 0 to 0.5;
(f) 0 to 0.99;
(g) 0 to 0.99; and
(h) 0 to 0.99
so that the total of all components is a mole fraction of 1.0.

Preferred modifiers from within the general description above include polymers containing epoxy functionality. The epoxy functional polymer is any of those polymers which contain a plurality of oxirane moieties including polymers and copolymers prepared by polymerizing an oxirane group containing monomer and those polymers in which the oxirane function is introduced subsequent to formation of the polymer chains as, for example, by epoxidation of pendant or main chain double bonds. The latter include epoxidized products of polymers such as polybutadiene or poly(styrene butadiene) or their partially hydrogenated derivatives. It also includes the epoxidized derivatives of EPDM rubbers.

The preferred epoxy functional polymer prepared by polymerization of an oxirane-containing monomer is a copolymer as described below and may include more than one monomer within each of the three classes:

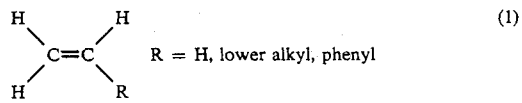

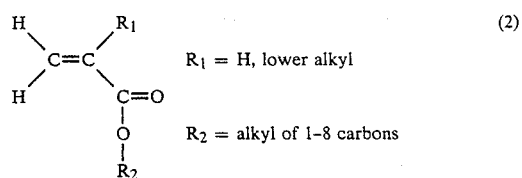

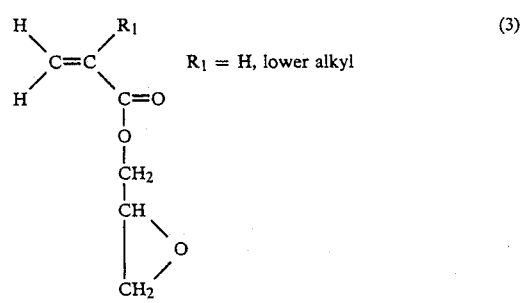

comprising 99.5 to 0 wt. % (1), 0 to 99.5 wt. % (2) and 0.4 to 15 wt. % (3). Minor amounts of other monomers may also be present.

More preferably, the epoxy containing polymer is a copolymer of ethylene, 0–40% alkyl(meth)acrylate, 0.7–7% glycidyl methacrylate. Most preferably, the epoxy containing polymer is a copolymer of ethylene, with 0–30% n-butyl acrylate and 1–5% glycidyl methacrylate (GMA). The GMA level of these epoxy polymers expressed as an epoxy number in milliequivalent of epoxide per gram of resin (meq/g) should be 0.025–1.06 meq/g, preferably 0.0704–0.493 meq/g, and most preferably 0.0704–0.352 meq/g. When the acrylate is n-butyl acrylate, this most preferred range corresponds to 1–5% GMA.

The above polymers optionally may also contain vinyl acetate or carbon monoxide.

The melt index (ASTM D-1238, condition E) of the epoxy containing polymer may vary from 0.5 to 50, preferably from 5 to 20.

Other additives as are known to those familiar with polymer compounding may be included in the composition. These additives include stabilizers including phosphites, antioxidants, flame retardants, reinforcing agents such as glass fiber and flake, minerals, ultraviolet light stabilizers, etc.

In all processing operations, it is necessary to dry the components of the thermoplastic product sufficiently to minimize unwanted hydrolytic degradation. Operating temperatures should also be selected consistent with obtaining a fluid melt but minimizing thermal degradation of the composition and its components.

The melt mixing of the components of the composition of the present invention can be carried out in any of the polymer melt mixing devices which are known to those skilled in the art as being capable of generating sufficient heat and shear to melt and adequately mix the starting materials. For example, the polymers can be mixed in an internal mixer such as a Brabender Mixer, in a Farrel Continuous Mixer (FCM), in a Buss Kneader, in a single screw extruder, or preferably in a twin screw extruder. It is preferable when mixing polymers at high temperatures to protect them from exposure to air by using a blanket of inet gas around the openings or ports of the mixing device.

Blending in a single screw extruder should be accomplished by feeding a physical mixture of all the components to be blended to an extruder which has been fitted with a screw that develops sufficient energy to melt and mix the components. The screw may be of a single-stage design for use in an unvented barrel or of a two-stage design for use with a vented barrel. The barrel temperature settings would be selected to provide the desired melt temperature and a screw speed selected within the normal operating range of the machine, usually near the upper end of the range. The product exit the die is normally pelletized if it is to be remelted in a subsequent step.

The compositions of this invention may also be compounded in a twin-screw extruder. As with the single screw extruder, blending in a twin screw extruder should be accomplished by feeding a physical mixture of all the components to be blended to the extruder. The ZSK series machines made by the Werner & Pfleiderer Company are examples of suitable twin-screw machines. These machines employ two intermeshing co-rotating screws which are assembled from various elements into a suitable configuration. The selection of a screw configuration is not critical to the invention. A typical configuration will use conveying elements to convey the feed material from the feed zone to a melting zone in which the material is compressed and melting begins. A section of "kneading blocks" followed by "reverse elements" next provides high shear and pressure to further the melting and mixing processes which permit the various reactions to begin. If the extrusion is to be conducted under vacuum, the reverse elements serve also to provide a melt seal following which the melt will be decompressed in the section under vacuum. Following the vacuum zone, the screw recompresses the melt and continues the dispersion process and may optionally again pass it through kneading blocks and reverse elements which, if present, also serve as a vacuum seal for this side of the vacuum zone. The melt is then further compressed and mixed as it passes through the end of the extruder and out the die. The die may be designed to form an end use shape directly, i.e., a profile, sheet or parison, or it may produce strand for pelletizing the product. In a machine such as a Baker-Perkins, the melt from the twin-screw mixer will be discharged to a single-screw extruder or other melt pump for pelletizing or shaping.

The compositions of the present invention may be processed into useful objects by the many fabricating processes known to those familiar with the art of fabricating thermoplastics. It may be formed into a useful shape directly exit the compounding extruder. Such shapes include, but are not limited to, sheets, film, rods, tubes, various profile shapes, coatings, and parisons for blow molding. These same products can, of course, also be made in the more usual manner by re-extruding pre-compounded product.

The compounded product will more typically be used to injection mold end-use objects. In this process the product of the invention in pellet form is introduced to the melting zone of a molding machine and converted to a fluid melt under the action of shear, applied heat and compression. The melt is then transferred (injected) under pressure to a mold operated at a temperature below the glass transition temperature (Tg) of the polyarylate and allowed to solidify.

The physical properties of the molded articles may depend on the manner in which it is fabricated. This is known to those skilled in the art of fabricating thermoplasstics containing dispersed phases. Processing parameters such as melt temperature, mold temperature, melt flow paths, melt shear rates, mold fill times, and part thickness all influence many of the physical properties of a fabricated object. These parameters must be considered as one selects and optimizes a fabricating process to produce a desired balance of properties.

In the following examples, all parts and percentages are by weight unless specified otherwise. Four polyamides were used:

(1) Polyamide A was a medium viscosity molding grade of 66 nylon having a molecular weight of approximately 18,000.

(2) Polyamide B was a molding grade of 6 nylon having a molecular weight of approximately 20,000.

(3) Polyamide C was a molding grade of nylon 12 having a molecular weight of approximately 20,000.

(4) Polyamide D was a molding grade of 612 nylon having a molecular weight of approximately 20,000.

In the following examples, four polyarylates were used:

(1) Polyarylate A was a polyarylate derived from 2,2'-bis(4-hydroxyphenyl)propane and a 50/50 mixture of isophthaloyl chloride and terephthaloyl chloride, with an I.V. of 0.60.

(2) Polyarylate B was a commercially blended polyarylate believed to have substantially the same chemical composition as polyarylate A, however, since it comes from a different source and minor compositional variations are possible, it will be identified separately from polyarylate A in the Examples.

(3) Polyarylate C was a polyarylate derived from 2,2'-bis(hydroxyphenyl)propane and isophthalic acid, with an I.V. of approximately 0.5.

(4) Polyarylate D was a polyacrylate derived from 2,2'-bis(hydroxyphenyl)propane and a 70/30 mixture of isophthaloyl chloride and terephthaloyl chloride, with an I.V. of 0.60.

In each of the following examples, the polycarbodiimide was a commercially available material containing units of the formula

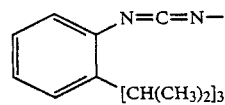

and having a number average molecular weight of approximately 5,900.

In the determination of molecular weight, a Hitachi Perkin-Elmer Vapor Pressure Osmometer was used with tetrahydrofuran (THF) at 35° C. Benzil was used for the calibration standard. A sample of the polycarbodiimide was weighed with a concentration of 0.5 g/100 ml THF and diluted to give concentrations of 0.15 g/100 ml, 0.25 g/100 ml and 0.36 g/100 ml THF. These four solutions were measured and the R of each divided by the concentrations was extrapolated to the zero point. This number was divided into the Instrument constant K calculated from the calibration curve to give the number average molecular weight.

In the following examples, five elastomeric modifiers were used:

(1) Modifier A was a 70.5% ethylene/25% n-butyl acrylate/4.5% glycidyl methacrylate terpolymer.

(2) Modifier B was a 99.5% ethylene/4.5% glycidyl methacrylate copolymer.

(3) Modifier C was a 73.6% ethylene/25% n-butyl acrylate/1.4% glycidyl methacrylate terpolymer.

(4) Modifier D was a 70% ethylene/25% n-butyl acrylate/5.0% glycidyl methacrylate terpolymer.

(5) Modifier E was an EPDM rubber grafted with 1.6% fumaric acid by the method disclosed in U.S. Pat. No. 3,884,882 and its RE 31,680.

In the following examples were noted, one or two hindered phenolic antioxidants were used:

(1) Antioxidant A was N,N'-hexamethylene bis(3,5-di-tert-butyl-4-hydroxy-hydrocinnamide).

(2) Antioxidant B was 1,3,5-trimethyl-2,4,6-tris(3,5-di-tert-butyl-4-hydroxybenzyl)benzene.

In each case the polyamide and the polyarylate were dried overnight in a vacuum oven before the blends were made. The various ingredients were melt blended on a Werner and Pfleider twin screw extruder using the typical configuration as described generally above, operated and described in detail as follows:

TABLE 1

| Examples | Extruder Size (mm) | RPM | Barrel Settings (°C.) | Screw Design (a) |
|---|---|---|---|---|
| 3–4 | 28 | 200 | 290 | two 036-305/015(K) two 061-024/008(R) |
| 5–10, 12–27 | 28 | 200 | 280–290 | two 036-305/015(K) one 061-024/016(R) |
| 11–12 | 30 | 225 | 280 | one 00.26-455/042(K) two 00.51-020/010(R) followed by one 00.26-455/042(K) one 00.51-020/010(R) |
| 28–31 | 28 | 200 | 280 | one 036-305/405(K) one 061-024/016(R) followed by two 036-305/015(K) one 061-024/008(R) |

The melt strand exiting the extruder was quenched in water and cut into pellets. The pellets were dried overnight in a vacuum oven with a slow nitrogen gas sweep at 120 to 140 degrees C. The dried pellets were injection molded into standard test bars on an injection molding machine with a 6 oz. barrel capacity. Notched Izod values were obtained for each of the samples as described in ASTM D-256. The specific compositions and the notched Izod values for each of the samples are shown in Table 2 below. Values originally obtained in English units have been converted to metric units and rounded where appropriate.

TABLE 2

COMPOSITION AND IZOD

| Ex. | Polyarylate (%) | Polyamide (%) | Modifier (%) | Polycarbodiimide (%) | Antioxidant (%) | Notched Izod (J/m) |
|---|---|---|---|---|---|---|
| 1 | — | A 100 | — | — | — | 64 |
| 2 | B 100 | — | — | — | — | 240 |
| 3 | — | A 99.5 | — | 0.5 | — | 69 |
| 4 | B 99.5 | — | — | 0.5 | — | 200 |
| 5 | A 59.8 | A 40 | — | — | A 0.2 | 15 |
| 6 | A 59.5 | A 40 | — | 0.5 | — | 69 |
| 7 | B 50.7 | A 40 | A 9 | — | 0.1A + 0.2B | 77 |
| 8 | B 50.2 | A 40 | A 9 | 0.5 | 0.1A + 0.2B | 120 |
| 9 | B 50.7 | A 40 | B 9 | — | 0.1A + 0.2B | 130 |
| 10 | B 50.2 | A 40 | B 9 | 0.5 | 0.1A + 0.2B | 230 |
| 11 | A 50.8 | B 40 | A 9 | — | A 0.2 | 69 |
| 12 | A 50.3 | B 40 | A 9 | 0.5 | A 0.2 | 260 |
| 13 | C 50.7 | C 40 | C 9 | — | 0.1A + 0.2B | 140 |
| 14 | C 50.4 | C 40 | C 9 | 0.3 | 0.1A + 0.2B | 311 |
| 15 | C 59.7 | C 40 | — | — | 0.1A + 0.2B | 43 |
| 16 | C 59.4 | C 40 | — | 0.3 | 0 1A + 0.2B | 63 |
| 17 | C 34.7 | D 50 | C 15 | — | 0.1A + 0.2B | 50 |
| 18 | C 33.7 | D 50 | C 15 | 1.0 | 0.1A + 0.2B | 197 |
| 19 | C 82.7 | D 15 | D 2 | — | 0.1A + 0.2B | 101 |
| 20 | C 82.2 | D 15 | D 2 | 0.5 | 0.1A + 0.2B | 187 |
| 21 | C 82.7 | D 15 | C 2 | — | 0.1A + 0.2B | 128 |
| 22 | C 81.7 | D 15 | C 2 | 1.0 | 0.1A + 0.2B | 197 |
| 23 | D 64.7 | D 25 | A 15 | — | 0.1A + 0.2B | 52 |
| 24 | D 63.7 | D 25 | A 15 | 1.0 | 0.1A + 0.2B | 197 |
| 25 | D 62.7 | D 32 | E 5 | — | 0.1A + 0.2B | 146 |
| 26 | D 62.65 | D 32 | E 5 | 0.05 | 0.1A + 0.2B | 178 |
| 27 | D 62.5 | D 32 | E 5 | 0.2 | 0.1A + 0.2B | 215 |
| 28 | B 39.9 | A 59.8 | — | — | 0.1 + 0.2B | 24 |
| 29 | B 39.7 | A 59.5 | — | 0.5 | 0.1A + 0.2B | 57 |
| 30 | B 29.3 | A 59.8 | E 10.6 | — | 0.1A + 0.2B | 74 |
| 31 | B 29.2 | A 59.5 | E 10.5 | 0.5 | 0.1A + 0.2B | 108 |

In Table 2 above, Examples 1–4 are control examples. That is, Example 1 demonstrates the Izod value for polyamide alone. Example 2 demonstrates the Izod value for polyarylate alone. Example 3 should be compared with Example 1 and demonstrates that there is no significant improvement from adding 0.5% polycarbodiimide to polyamide alone. Similarly, Example 4 should be compared with Example 2 and demonstrates that, in fact, there is a slight decrease in Izod resulting from the addition of polycarbodiimide to polyarylate alone. Example 5 shows that when polyarylate and polyamide are blended together, even in the presence of antioxidant, the resulting Izod is lower than the Izod of either component taken separately. In contrast, Example 6 can be compared with Example 5 and shows the beneficial effect of adding polycarbodiimide to a blend of polyarylate and polyamide. Likewise, the remaining examples can be viewed in pairs. In each case, and demonstrating the beneficial effect of adding a polycarbodiimide ranging in quantity from as little as 0.05% polycarbodiimide to as much as 1.0% polycarbodiimide to various blends of polyarylates and polyamides, the quantity of polyamide being varied from as little as 15 weight % to as much as 50 weight %. Similarly, the number of examples demonstrates further added benefit to including the compositions a certain quantity of elastomeric modifier. Five different elastomeric modifiers are demonstrated and their concentrations range from a low of 2 weight % to a maximum of 15 weight %. In all, the examples and data presented above clearly demonstrate in a series of side-by-side comparisons the improvement in notched Izod that results from the inclusion in blends of polyamides with polyacrylates of a small quantity of polycarbodiimide.

I claim:

1. A polyarylate composition consisting essentially of:
   (a) 10–60 weight percent of at least one polyamide resin;
   (b) 0.05–1 weight percent of at least one polycarbodiimide having a number average molecular weight greater than (2,000) and containing units of the formula,

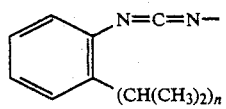

where n has an average value of about 3,
   (c) a complemental amount of at least one polyarylate resin, which is the reaction product of at least one compound selected from dihydric phenols and derivatives thereof, and at least one compound selected from aromatic acids and derivatives thereof, and
   (d) 0–20 weight percent of an elastomeric modifier, with the above weight percents based on the total weight of components (a), (b), (c), and (d) of the composition.

2. The composition of claim 1 wherein the weight percent of the at least one polyamide resin is 30–50.

3. The composition of claim 2 wherein the weight percent of the at least one polycarbodiimide is 0.2–0.5.

4. The composition of claim 1 wherein the weight percent of the at least one polyamide resin is 35–50.

5. The composition of claim 4 wherein the weight percent of the at least one polycarbodiimide is 0.1–0.5.

6. The composition of claim 1 wherein the weight percent of the at least one polcarbodiimide is 0.1–0.5.

7. The composition as in claim 3, further comprising 5–15 weight percent, based on total composition weight, of an elastomeric modifier.

8. The composition as in claim 5, further comprising about 10 weight percent, based on total composition weight, of an elastomeric modifier.

9. The composition of claim 1 wherein the polyamide is the condensation reaction product of at least one dicarboxylic acid containing 4–12 carbon atoms and at least on diamine containing 4–14 carbons.

10. The composition of claim 1 wherein the polyamide is a material selected from the group consisting of polycaprolactam, polyhexamethylene adipamide, polyhexamethylene azelaamide, polyhexamethylene dodecanoamide, poly- -undecanamide, polylaurolactam, bis(paraaminocyclo-hexyl)methane dodecanoamide.

11. The composition of claim 1 wherein the polyamide is a polycaprolactam.

12. The composition of claim 1 wherein the polyamide is polyhexamethylene adipamide.

13. The composition of claim 1 wherein the polyamide is polyhexamethylene dodecanoamide.

14. The composition of claim 1 wherein the polyamide is polylaurolactam.

15. The composition of claim 1 wherein the polyamide has a molecular weight of greater than 5000.

16. The composition of claim 1 wherein the polycarbodiimide has a molecular weight of about 59,000.

17. The composition of claim 1 wherein the polyarylate is the reaction product of 2,2'-bis(4-hydroxyphenyl)propane and at least one compound selected from terephthalic acid, isophthalic acid, and derivatives thereof.

18. The composition of claim 17 wherein the ratio of isophthalic acid and derivatives thereof to terephthalic acid and derivatives thereof is 100:0–40:60.

19. The composition of claim 18 wherein the ratio is 100:0–50:50.

20. The composition of claim 1 wherein the polyarylate resin has a molecular weight of greater than 10,000.

21. The composition of claim 1 wherein the elstomeric modifier is a copolymer of at least two of the following monomers:

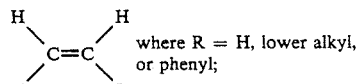

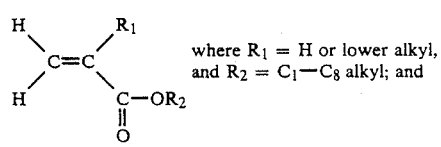

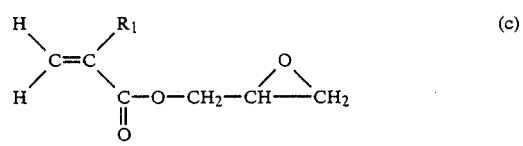

where $R_1$ = H or lower alkyl, where the monomers of formula (a) comprise 50–99 weight percent of the copolymer, the monomers of formula (b) comprise 0–40 weight percent of the copolymer, and the monomers of formula (c) comprise 1–10 weight percent of the copolymer.

22. The composition of claim 20 wherein the elastomeric modifier is a copolymer of 65-84 weight percent ethylene, 20-30 weight percent n-butyl acrylate, and 1-5 weight percent glycidyl methacrylate.

23. The composition of claim 21 wherein the elastomeric modifier is a copolymer of 95-99 weight percent ethylene and 1-5 weight percent glycidyl methacrylate.

24. The composition of claim 1 wherein the elastomeric modifier is a graft polymer consisting essentially of at least one monomer containing a functional acid group and at least one substantially saturated copolymer of ethylene and $C_3$-$C_8$ alpha-olefins.

25. The composition of claim 24 wherein the at least one monomer containing a functional acid group is selected from the group consisting of unsaturated carboxylic anhydrides and dianhydrides.

26. The composition of claim 24 wherein the monomer is fumaric acid.

27. The composition of claim 27 wherein the copolymer is derived from ethylene and propylene and 1,4-hexadiene.

* * * * *

UNITED STATES PATENT AND TRADEMARK OFFICE
CERTIFICATE OF CORRECTION

PATENT NO. : 4,861,828

DATED : August 29, 1989

INVENTOR(S) : Marion Glen Waggoner

It is certified that error appears in the above-identified patent and that said Letters Patent is hereby corrected as shown below:

In the Claims:
Claim 27:
Column 16, line 9, replace "27" with --26--.

Signed and Sealed this

Eleventh Day of September, 1990

Attest:

HARRY F. MANBECK, JR.

Attesting Officer

Commissioner of Patents and Trademarks